3,076,045
PROCESS FOR THE PRODUCTION OF
CYCLODODECATRI-(1,5,9)-ENES
Kurt Schneider, Oberhausen, Rhineland, and Hermann Schnell, Krefeld-Urdingen, Germany, assignors to Studiengesellschaft Kohle m.b.H., Mulheim-Ruhr, Germany
No Drawing. Filed Mar. 4, 1960, Ser. No. 12,690
Claims priority, application Germany Mar. 10, 1959
11 Claims. (Cl. 260—666)

This invention relates to a process for the production of cyclododecatri-(1,5,9)-enes.

The production of cyclododecatri-(1,5,9)-enes concurrently with other cyclic hydrocarbons by subjecting butadiene, isoprene and piperylene to the action of catalysts is known. Thus, for example, the copending application No. 641,252 filed February 20, 1957, relates to a process in which cyclododecatri-(1,5,9)-enes are obtained in yields up to 80% with the use of catalysts comprising a titanium halide and an alkyl aluminum halide. The process is carried out at temperatures up to 150° C., preferably in the presence of a solvent, especially an aliphatic, aromatic or halogenated hydrocarbon.

In the process of the copending application No. 710,426 filed January 22, 1958, the above-mentioned result was also obtained with the use of a catalyst which comprises an aluminum dialkyl compound and an aluminum trialkyl and a chromium compound.

Furthermore, it was already suggested to use catalysts which consist of aluminum trialkyls or dialkyl aluminum hydrides and titanium compounds in a molar ratio from 1Ti:0.5 to 2Al.

In the processes mentioned above, small amounts of vinyl cyclohexene-(3) and cyclooctadiene-(1,5), higher cyclic homologues of cyclododecatriene and, above all, straight-chain linear high polymers of butadiene are formed as by-products. The formation of these high polymers is particularly undesirable because they obstinately retain entrapped cyclododecatriene and in general can be removed only by precipitation with larger amounts of acetone or methanol. In addition, the high-polymers which are initially dissolved in the reaction mixture effect a considerable increase in the viscosity of the solution so that the absorption of butadiene decreases after some time due to poor agitation of the viscous solution.

It has now been found that the formation of the undesirable by-products in the production of cyclododecatri-(1,5,9)-enes can be largely repressed by using catalysts which, in addition to aluminum alkyl halides and titanium halides, contain compounds which have a semipolar double bond in the molecule.

The semipolar compound may be added to the individual components of the catalyst mixture before giving the same together or to the finished mixture of components.

Preferred semipolar compounds which may be added to the catalysts are sulfoxides such as dimethyl sulfoxide and dibenzyl sulfoxide; aminoxides such as triethylaminoxide and dimethyl aniline oxide, and, finally, nitrones such as n-propyl-N-cyclohexyl nitrone and, if necessary or desired, water in small amounts. With isonitrones, the effect desired is not obtained. The concentration of the semipolar compound in the catalyst composition may vary within wide limits. For example, good results are obtained with concentrations of 0.1 to 20 mole-percent. A maximum yield of cyclododecatriene, minimum formation of by-products and a maximum space-time yield are obtained when using equal molar concentrations of the semipolar compound and the titanium halide charged.

The reaction temperature is the same as that used in the processes of the patent applications mentioned above and is not restricted to narrow limits. Particularly satisfactory results are obtained in a temperature range of, for example, about 20° to about 80° C. and preferably of about 30° to about 70° C., the optimum reaction temperature being about 50° C.

A preferred catalyst for the process of the invention consists of aluminum diethyl monochloride and titanium tetrachloride. The incorporation of the additive of the invention in catalysts known per se for the production of cyclododecatrienes permits the yields of cyclododecatriene to be increased to as high as 94%. In addition, the space-time yield of cyclododecatriene for a given catalyst concentration is increased to several times the amount previously obtained. The formation of high molecular weight straight-chain linear high-polymers of butadiene which are particularly undesirable by-products is reduced to a substantially negligible amount.

The cyclic compounds obtained by the process of the invention are valuable starting materials for organic syntheses. They may, for example, be hydrogenated in known manner. Thus, cyclododecene or cyclododecane is obtained from cyclododecatri-(1,5,9)-ene. These hydrogenated products may in turn be oxidized in known manner to form the corresponding dicarboxylic acids.

The cyclododecatriene itself may also be oxidized directly to form succinic acid.

The dicarboxylic acids obtained from the products of the invention are known valuable starting materials for the production of plastics, for example polyamides.

The following examples further illustrate the invention.

Example 1

In a reaction vessel of 5 liters capacity, 50 ml. of aluminum diethyl monochloride dissolved in 1.5 liters of absolute benzene are mixed in known manner with 10 ml. of titanium tetrachloride (molar ratio of Al:Ti=4.57:1)

in a nitrogen atmosphere while stirring. Upon heating to 40° C., 2.51 kgs. of butadiene are introduced within 6 hours into the brown-colored suspension. After cooling to room temperature, steam is injected. There are obtained 2.03 kgs. of cyclododecatri-(1,5,9)-ene corresponding to a yield of 81% of the theory. 4.6 gms. of polymer/hr./mmol Ti.

To the catalyst solution described above are added 7.1 grams of dimethyl sulfoxide. Upon heating to 40° C., 2.37 kgs. of butadiene are introduced within 105 minutes while thoroughly cooling. After cooling of the fluid reaction mixture, steam is injected. In doing so, 2.13 kgs. of cyclododecatriene are distilled. This corresponds to a yield of 90% of the theory. 14.9 gms./hr./mmol Ti.

While only 338 grams/hr. of cyclododecatriene are formed when effecting the polymerization without the addition of dimethyl sulfoxide, 1216 gms., i.e. 3.6 times this quantity of cyclododecatriene are formed when using dimethyl sulfoxide.

Example 2

In a reaction vessel of 1.25 liters capacity, 7.24 grams (60 mmols) of aluminum diethyl monochloride are dissolved in 400 ml. of absolute benzene and 1.14 gms. (6 mmols) of titanium tetrachloride. Upon heating to 50° C., butadiene at a rate of about 90 liters/hr. is introduced into the resulting brown suspension. To maintain the reaction temperature of 50° C., cooling by means of a slight air current is sufficient. After one hour, the supply of butadiene is discontinued. The reaction is allowed to proceed for a few additional minutes and the catalyst is then decomposed with the calculated amount of methanol. Inorganic catalyst ingredients are removed with the calculated amount of 2 N sulfuric acid and the high polymeric constituents are precipitated with a 1:1 mixture of methanol and acetone. Since the high-polymers still contain entrapped cyclododecatriene, they must be freed therefrom by frequent kneading with small amounts of acetone. In this manner, 26 gms. of high-polymers are obtained. After having distilled off the solvent vacuum distillation of the residue results in 7 grams of first runnings boiling up to 111° C. at 15 mm. Hg, 180 gms. of a main fraction boiling between 111 and 116° C. at 15 mm. Hg (melting point, −16° to −18° C.), and 16 gms. of a distillation residue. Thus, the percentage composition of the reaction products is as follows:

| | Percent |
|---|---|
| First runnings | 3.1 |
| Cyclododecatriene | 78.6 |
| Residue | 7.0 |
| High-polymers | 11.3 |

When operating in this manner, 180 gms./hr. of cyclododecatriene are obtained with 8.3 gms. of catalyst composition in 400 ml. of benzene.

A solution of 6 mmols=468 mg. of dimethyl sulfoxide in 20 ml. of benzene is added within 5 minutes to the catalyst solution described above. The colour of the reaction mixture turns to black-brown and the temperature of the mixture increases slightly. Upon heating to 50° C., butadiene is introduced at a rate of about 250 liters/hr. Heat is evolved to an extent that the reaction temperature of 50° C. can only be maintained by cooling with a mixture of ice and sodium chloride. The reaction mixture, in contrast to that described above, remains completely fluid. The quantity of butadiene absorbed during one hour of introduction is 585 grams. After decomposition of the catalyst, 5.2 gms. of first runnings, 540 gms. of cyclododecatriene, 27.7 gms. of residue and 4.1 gms. of high polymeric portions are obtained by distillation. Accordingly, the composition of the reaction products in percent is as follows:

| | Percent |
|---|---|
| First runnings | 0.9 |
| Cyclododecatriene | 93.6 |
| Residue | 4.8 |
| High-polymers | 0.7 |

The quantity of cyclododecatriene formed in one hour is 540 grams which is three times the amount obtained in the experiment effected without the addition of dimethyl sulfoxide.

*Example 3*

1.14 gms. of titanium tetrachloride are added dropwise into a mixture of 250 ml. absolute benzene, 7.24 gms. of aluminum diethyl monochloride and 6 mmol dibenzyl sulfoxide. At 50° C., butadiene is introduced at a rate of 220 liters/hr. In doing so, intense cooling is required. After 25 minutes, the reaction vessel is full to the brim. The quantity of cyclododecatriene obtained by processing the reaction mixture is 2.5 times that obtained in a comparative experiment carried out without the addition of dibenzyl sulfoxide to the catalyst mixture.

The percentage distribution of the reaction products obtained in this example and in a comparative experiment carried out without the addition of dibenzyl sulfoxide is shown in the following table:

| | With dibenzyl sulfoxide | Without dibenzyl sulfoxide |
|---|---|---|
| First runnings | 5 gms., 0.9% | 1.9 gms., 1.8%. |
| Cyclododecatriene | 191 gms., 86.4% | 76.8 gms., 74.1%. |
| Residue | 14 gms., 6.4% | 16.9 gms., 16.3%. |
| High-polymers | 14 gms., 6.3% | 8.1 gms., 7.8%. |

Di-n-butyl sulfoxide, di-n-heptyl-sulfoxide and benzyl phenyl sulfoxide may be used in place of dibenzyl sulfoxide. The improvements obtained therewith are the same as described above.

*Example 4*

If 6 mmols=702 mgs. of triethyl aminoxide in place of 6 mmols of dibenzyl sulfoxide are added to the catalyst mixture of Example 3, the following results are obtained as compared with the use of a catalyst to which a semipolar compound was not added:

| | With triethyl aminoxide | Without triethyl aminoxide |
|---|---|---|
| First runnings | 5 gms., 2.5% | 3 gms., 2.1%. |
| Cyclododecatriene | 177 gms., 86.7% | 105 gms., 74.0%. |
| Residue | 20 gms., 9.8% | 19 gms., 13.4%. |
| High-polymers | 2 gms., 1.0% | 15 gms., 10.5%. |

*Example 5*

The experiment described in Example 3 is repeated except that 6.5 mmols of n-propyl-N-cyclohexyl nitrone in place of dibenzyl sulfoxide is added to the catalyst mixture and butadiene is added at a rate of about 200 liters/hr. is introduced at 50° C. for 40 minutes while intensely cooling. The yields given below are obtained in processing the reaction mixture. For comparison, the yields obtained in an experiment carried out without the addition of a semipolar compound are also shown.

| | With n-propyl-N-cyclohexyl nitrone | Without additive |
|---|---|---|
| First runnings | 3 gms., 0.9% | 4 gms., 2.2%. |
| Cyclododecatriene | 281 gms., 88.3% | 137 gms., 77.0%. |
| Residue | 30 gms., 9.4% | 21 gms., 11.8%. |
| High polymers | 3 gms., 0.9% | 16 gms., 9.0%. |

*Example 6*

In a reaction vessel of 500 ml. capacity, 60 mmols of aluminum diethyl monochloride are dissolved in known manner in 1.5 liters of benzene and mixed with 6 mmols of $TiCl_4$ while stirring under a nitrogen atmosphere. Upon warming up to 40° C., butadiene is introduced. The experiment was carried out with a water content of (1) 0.01% in the benzene and (2) 0.2% in the benzene. The results obtained are listed below:

| | 1 | 2 |
|---|---|---|
| Reaction product, gms | 153 | 199 |
| Percent $C_8H_{12}$ | 1.3 | 2.0 |
| Percent $C_{12}H_{18}$ | 79.8 | 84.5 |
| Percent $C_{16}H_{24}$ and higher hydrocarbons | 11.8 | 9.6 |
| Percent high polymers | 7.2 | 4.0 |
| Gms. $C_{12}H_{18}$/hr | 183 | 593 |

What is claimed is:

1. Process for the production of cyclododecatri-(1,5,9)-enes which comprises contacting a member selected from the group consisting of butadiene, isoprene and piperylene with a catalyst comprising a titanium halide, alkyl aluminum halide and a compound having a semipolar double bond in its molecule which is a member selected from the group consisting of sulfoxides, aminoxides and nitrones, to thereby form cyclododecatri-(1,5,9)-enes with other cyclic hydrocarbons containing at least 8 carbon atoms and at least two double bonds in the ring.

2. Process according to claim 1 in which said contacting is effected in the presence of an organic chemically inert solvent.

3. Process according to claim 2 in which said solvent is a member selected from the group consisting of aromatic, aliphatic, and halogenated hydrocarbons.

4. Process according to claim 1 in which said contacting is effected at a temperature between about −20 degrees C. and 150 degrees C.

5. Process according to claim 1 in which said compound having a semi-polar bond is dimethyl sulfoxide.

6. Process according to claim 1 in which said compound having a semi-polar bond is dibenzyl sulfoxide.

7. Process according to claim 1 in which said compound having a semi-polar bond is triethyl aminoxide.

8. Process according to claim 1 in which said compound having a semi-polar bond is dimethyl aniline oxide.

9. Process according to claim 1 in which said compound having a semi-polar bond is n-propyl-N-cyclohexyl nitrone.

10. Process according to claim 1 in which said compound having a semi-polar bond is employed in an amount of from 0.1 to 20 mol percent referred to the total amount of said catalyst.

11. Process according to claim 1 in which said compound having a semi-polar bond is employed in an equimolecular amount with respect to the amount of titanium halide present in said catalyst.

References Cited in the file of this patent

UNITED STATES PATENTS 2,888,498     Carroll et al. _____ May 26, 1959

FOREIGN PATENTS 1,050,333     Germany _____ Feb. 12, 1959